United States Patent
Hsu et al.

(10) Patent No.: US 10,252,497 B2
(45) Date of Patent: Apr. 9, 2019

(54) MULTILAYER COMPOSITION FOR PACKAGING

(71) Applicant: BASF SE, Ludwigshafen (DE)

(72) Inventors: Chien Hsu, Grosse Ile, MI (US); Marco Balbo Block, Hamburg (DE); Andre Kamm, Bohmte (DE)

(73) Assignee: BASF SE, Ludwigshafen (DE)

( * ) Notice: Subject to any disclaimer, the term of this patent is extended or adjusted under 35 U.S.C. 154(b) by 153 days.

(21) Appl. No.: 14/908,074

(22) PCT Filed: Jul. 23, 2014

(86) PCT No.: PCT/US2014/047739
§ 371 (c)(1),
(2) Date: Jan. 27, 2016

(87) PCT Pub. No.: WO2015/017202
PCT Pub. Date: Feb. 5, 2015

(65) Prior Publication Data
US 2016/0185086 A1    Jun. 30, 2016

Related U.S. Application Data

(60) Provisional application No. 61/861,462, filed on Aug. 2, 2013.

(51) Int. Cl.

| | |
|---|---|
| B32B 27/08 | (2006.01) |
| B32B 37/12 | (2006.01) |
| C08L 67/00 | (2006.01) |
| B32B 7/12 | (2006.01) |
| B32B 15/08 | (2006.01) |
| B32B 15/20 | (2006.01) |
| B32B 27/30 | (2006.01) |
| B32B 27/32 | (2006.01) |
| B32B 27/34 | (2006.01) |
| B32B 27/36 | (2006.01) |
| C08L 75/00 | (2006.01) |
| C08G 18/10 | (2006.01) |
| C08G 18/42 | (2006.01) |
| C09J 175/04 | (2006.01) |
| B32B 38/00 | (2006.01) |
| B32B 38/14 | (2006.01) |
| C08G 101/00 | (2006.01) |

(52) U.S. Cl.
CPC .............. *B32B 27/08* (2013.01); *B32B 7/12* (2013.01); *B32B 15/08* (2013.01); *B32B 15/20* (2013.01); *B32B 27/302* (2013.01); *B32B 27/32* (2013.01); *B32B 27/34* (2013.01); *B32B 27/36* (2013.01); *B32B 37/12* (2013.01); *B32B 38/145* (2013.01); *C08G 18/10* (2013.01); *C08G 18/42* (2013.01); *C08L 67/00* (2013.01); *C08L 75/00* (2013.01); *C09J 175/04* (2013.01); *B32B 38/14* (2013.01); *B32B 2255/06* (2013.01); *B32B 2255/10* (2013.01); *B32B 2255/26* (2013.01); *B32B 2255/28* (2013.01); *B32B 2439/00* (2013.01); *B32B 2439/70* (2013.01); *C08G 2101/00* (2013.01)

(58) Field of Classification Search
CPC .... C08G 63/00; C08G 63/668; C08G 63/672; C08G 83/005; C08G 18/10; C08G 18/16; C08G 18/72; C08L 67/02
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 5,376,460 A | 12/1994 | Hardeman et al. |
| 5,556,925 A | 9/1996 | Kousaka et al. |
| 6,569,956 B1 | 5/2003 | Ramesh |
| 6,974,631 B2 | 12/2005 | Hayes et al. |
| 2005/0147834 A1* | 7/2005 | Bruchmann ............ B32B 27/00 428/458 |
| 2005/0165177 A1 | 7/2005 | Wagner et al. |
| 2005/0246991 A1 | 11/2005 | Chen et al. |

(Continued)

FOREIGN PATENT DOCUMENTS

| | | |
|---|---|---|
| DE | 11 52 536 B | 8/1963 |
| DE | 11 52 537 B | 8/1963 |

(Continued)

OTHER PUBLICATIONS

International Search Report and Written Opinion of the International Searching Authority for Application No. PCT/US2014/047739, dated Nov. 6, 2014, 11 pages.

Extended EP Search Report in EP Application No. 14832305.8, dated Mar. 2, 2017 (9 pages).

First Office Action in CN Application No. 201480042613.X, dated Mar. 2, 2017 (English translation included—12 pages).

(Continued)

*Primary Examiner* — Betelhem Shewareged
(74) *Attorney, Agent, or Firm* — Foley & Lardner LLP

(57) ABSTRACT

A multilayer composition for packaging comprising a first polymer film, a second film, at least one print layer between the films and a 1 K isocyanate prepolymer adhesive layer between the at least one print layer and one of the films, where the print layer contains a hyperbranched polyester binder containing functional groups selected from the group consisting of —OH, —COOH and —COOR, where R is methyl, ethyl, vinyl, isopropyl, n-propyl, n-butyl, isobutyl, sec-butyl or tert-butyl provides packaging laminates with excellent adhesion. The hyperbranched polyester is for example a polymer of trimethyolpropane and hexahydrophthalic anhydride and optionally a cycloaliphatic diol.

22 Claims, No Drawings

(56) References Cited

U.S. PATENT DOCUMENTS

| | | | |
|---|---|---|---|
| 2005/0250914 A1* | 11/2005 | Stumbe | C08G 63/668 |
| | | | 525/437 |
| 2005/0256991 A1* | 11/2005 | Keller | G06F 13/423 |
| | | | 710/309 |
| 2007/0213501 A1 | 9/2007 | Bruchmann et al. | |
| 2009/0266482 A1 | 10/2009 | Garmann et al. | |
| 2012/0263925 A1 | 10/2012 | Parra Pastor et al. | |
| 2014/0065385 A1 | 3/2014 | Bruchmann et al. | |
| 2014/0193619 A1 | 7/2014 | Bruchmann et al. | |

FOREIGN PATENT DOCUMENTS

| | | |
|---|---|---|
| EP | 0 707 956 A1 | 4/1996 |
| EP | 0 802 045 A1 | 10/1997 |
| JP | 05-007832 A | 1/1993 |
| JP | 09-302064 | 11/1997 |
| WO | WO-2012/140175 | 10/2012 |

OTHER PUBLICATIONS

Office Action in JP Application No. No. 2016-531759, dated May 7, 2018 (English translation only). (6 pages).

\* cited by examiner

MULTILAYER COMPOSITION FOR PACKAGING

This application is the U.S. 371 National Stage Application of International Application No.: PCT/US2014/047739, filed Jul. 23, 2014, which claims the benefit of, and priority to, U.S. Provisional Patent Application No. 61/861,462, filed Aug. 2, 2013, the contents of which are incorporated herein by reference in their entireties.

Disclosed is a multilayer laminate film construction for packaging. The multilayer construction comprises at least two polymer films, at least one print layer between the two films and a 1K isocyanate prepolymer adhesive layer between the print layer and one of the films, where the print layer contains a hyperbranched polyester binder. The multilayer laminate film construction is suitable for flexible packaging.

Adhesives employed in multilayer constructions for packaging are typically 2K polyurethanes. A 2K polyurethane system employs for instance a polyisocyanate or a polyisocyanate prepolymer and a long chain polyol, a chain extender and a catalyst. The use of a 2K system requires mixing of the components just prior to their application.

It would be a great improvement if a truly 1K polyurethane could be employed. This would significantly improve packaging lamination process efficiency. No mixing of adhesive components prior to application would be required.

Surprisingly, an excellent packaging lamination system has been found that may employ a 1K polyurethane adhesive.

Disclosed is multilayer composition for packaging comprising a first polymer film, a second film, at least one print layer between the films and a 1K isocyanate prepolymer adhesive layer between the print layers and one of the films, where the print layer contains a hyperbranched polyester binder containing functional groups selected from the group consisting of —OH, —COOH and —COOR, where R is methyl, ethyl, vinyl, isopropyl, n-propyl, n-butyl, isobutyl, sec-butyl or tert-butyl.

DETAILED DISCLOSURE

Isocyanate Prepolymer Adhesive Layer

The 1K isocyanate prepolymers are prepared by known methods and are reaction products of excess organic polyisocyanate compounds and polyol compounds. The isocyanate prepolymers are terminated with NCO groups.

The polyisocyantes are preferably diisocyanates of formula $X(NCO)_2$, where X is an aliphatic hydrocarbon of 4 to 15 carbon atoms, a cycloaliphatic or aromatic hydrocarbon of 6 to 15 carbon atoms or an araliphatic hydrocarbon of 7 to 15 carbon atoms.

The organic polyisocyanates comprise aliphatic, cycloaliphatic, and aromatic di- or polyfunctional isocyanates known from the prior art and also any desired mixtures thereof. Examples of suitable diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, monomeric methanediphenyl diisocyanate (MMDI), for example methanediphenyl 4,4'-diisocyanate (4,4'-MDI) and methanediphenyl 2,4'-diisocyanate (2,4'-MDI), mixtures of monomeric methanediphenyl diisocyanates, polymeric methanediphenyl diisocyanate having a larger number of rings (PMDI), p-xylylene diisocyanate, tetramethylxylylene diisocyanate (TMXDI), the isomers of bis(4-isocyanatocyclohexyl)methane (HMDI), such as the trans/trans, the cis/cis, and the cis/trans isomer and mixtures of these compounds.

Preferably, the diisocyanate is MDI. A mixture of 4,4'-MDI and 2,4'-MDI is especially effective. The weight/weight ratio of the mixture is for instance from about 1:10 to about 10:1. Polymeric MDI is also very effective (PMDI).

Suitable polyol compounds are known to the person skilled in the art and are described by way of example in "Kunststoffhandbuch, Band 7, Polyurethane" (Plastics handbook, volume 7, Polyurethanes), Carl Hanser Verlag, 3rd edition 1993, chapter 3.1.

The polyol compounds are for example selected from the group consisting of polyetherols, polyesterols, polycarbanatediols polylactonediols, polymer polyols and mixtures thereof.

The polyol compounds comprise for instance polyetherols or polyesterols having at least two hydrogen atoms reactive toward isocyanate groups. The number-average molecular weight of the polyol compounds is preferably greater than 450 g/mol, particularly preferably from greater than 500 to 12,000 g/mol and in particular from 600 to 8000 g/mol.

Molecular weights are measured according to gel permeation chromatography (GPC) or via the hydroxyl value of the polyol (titration method).

Polyetherols are produced by known processes, for example via anionic polymerization using alkali metal hydroxides or using alkali metal alcoholates as catalysts and with addition of at least one starter molecule which comprises from 2 to 3 reactive hydrogen atoms or via cationic polymerization using Lewis acids, such as antimony pentachloride or boron fluoride etherate, from one or more alkylene oxides having from 2 to 4 carbon atoms in the alkylene moiety. Examples of suitable alkylene oxides are propylene 1,3-oxide, butylene 1,2- or 2,3-oxide and preferably ethylene oxide and propylene 1,2-oxide. Tetrahydrofuran monomer can also be used. Other catalysts that can also be used are multimetal cyanide compounds, known as DMC catalysts. The alkylene oxides can be used individually, in alternating succession, or in the form of a mixture. Preference is given to mixtures of propylene 1,2-oxide and ethylene oxide, where amounts of from 10 to 50% of the ethylene oxide are used in the form of ethylene oxide end-cap ("EO-cap"), in such a way that the resultant polyols have more than 70% of primary OH end groups. Starter molecules that can be used are water or di- and trihydric alcohols, such as ethylene glycol, 1,2- and 1,3-propanediol, diethylene glycol, dipropylene glycol, 1,4-butanediol, glycerol or trimethylolpropane.

The polyetherols, preferably polyoxypropylene or polyoxyethylene polyols or their mixture, preferably have hydroxyl functionality of from 1.7 to 3 and their number-average molecular weight are from 1000 to 12,000 g/mol, preferably from 1500 to 8000 g/mol, in particular from 2000 to 6000 g/mol.

Polyesterols can be produced from organic dicarboxylic acids having from 2 to 20 carbon atoms, preferably aliphatic dicarboxylic acids having from 4 to 6 carbon atoms and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids here can be used either individually or in else in a mixture with one another. It is also possible to use the appropriate dicarboxylic derivatives instead of the free dicarboxylic acids, examples being dicarboxylic esters of alcohols having from 1 to 4 carbon atoms and also dicarboxylic anhydrides. It is preferable to use dicarboxylic acid mixtures made of succinic, glutaric and adipic acid in quantitative proportions of, for example, from 20 to 35, from 35 to 50 and from 20 to 32 parts by weight and in particular adipic acid. Examples of di- and polyhydric alcohols, in particular diols, are: ethanediol, diethylene glycol, 1,2- and 1,3-propanediol, dipropylene glycol, 1,4-butanediol, 1,5-pentanediol, 1,6-hexanediol, 1,10-decanediol, glycerol, and trimethylolpropane. It is preferable to use ethanediol, diethylene glycol, 1,4-butanediol, 1,5-pentanediol and 1,6-hexanediol. It is also possible to use polyesterols made of lactones, e.g. ε-caprolactone, or hydroxycarboxylic acids, e.g. ω-hydroxycaproic acid.

Polyesterols are prepared via polycondensation of organic, e.g. aromatic and preferably aliphatic, dicarboxylic acids and/or their derivatives and polyhydric alcohols, without catalyst or preferably in the presence of esterification catalysts, advantageously in an atmosphere of inert gas, e.g. nitrogen, carbon monoxide, helium or argon, in the melt at temperatures of from 150 to 250° C., preferably from 180 to 220° C., optionally at reduced pressure, until the desired acid number, which is preferably less than 10 and particularly preferably less than 2, has been reached. In one preferred embodiment, the esterification mixture is polycondensed at the abovementioned temperatures as far as an acid number of from 80 to 30, preferably from 40 to 30, under atmospheric pressure, and then under a pressure smaller than 500 mbar, preferably from 50 to 150 mbar. Examples of esterification catalysts used are iron catalysts, cadmium catalysts, cobalt catalysts, lead catalysts, zinc catalysts, antimony catalysts, magnesium catalysts, titanium catalysts and tin catalysts, in the form of metals, of metal oxides, or of metal salts. However, the polycondensation reaction can also be carried out in the liquid phase in the presence of diluents and/or entrainers, e.g. benzene, toluene, xylene or chlorobenzene, for the removal of the water of condensation by azeotropic distillation. To produce the polyesterols, the organic polycarboxylic acids and/or derivatives thereof, and polyhydric alcohols, are advantageously polycondensed in a molar ratio of 1:from 1 to 1.8, preferably 1:from 1.05 to 1.2.

The hydroxyl functionality of the polyesterols is preferably from 2 to 4, in particular from 2 to 3, their number-average molecular weight being from 480 to 3000 g/mol, preferably from 1000 to 3000 g/mol.

Polycarbonatediols may be obtained, for example, by reacting phosgene with an excess of the dihydric alcohols specified as synthesis components for the polyesterols.

Polylactonediols are homopolymers or copolymers of lactones end-capped with a suitable dihydric alcohol starter molecule. Suitable lactones are preferably those deriving from compounds of the general formula HO—$(CH_2)_z$—COOH, where z is a number from 1 to 20 and where an H atom of a methylene unit may also have been substituted by a $C_1$ to $C_4$ alkyl group. Examples are ε-caprolactone, β-propiolactone, γ-butyrolactone, methyl-γ-caprolactone and mixtures thereof. Suitable starter components are, for example, the dihydric alcohols specified above as a synthesis component for the polyesterols. The corresponding polymers of ε-caprolactone are particularly preferred. Lower polyesterols or polyetherols as well can be used as starters for preparing the lactone polymers. In lieu of the polymers of lactones it is also possible to use the corresponding, chemically equivalent polycondensates of the hydroxy carboxylic acids corresponding to the lactones.

Other suitable polyols are polymer-modified polyols (polymer polyols), preferably polymer-modified polyesterols or polyetherols, particularly preferably graft polyetherols or graft polyesterols, in particular graft polyetherols. These are what is known as a polymer polyol which usually has from 5 to 60% by weight content of preferably thermoplastic polymers, preferably from 10 to 55% by weight, particularly preferably from 30 to 55% by weight, and in particular from 40 to 50% by weight. These polymer polyols are described by way of example in EP250351, and are usually produced via free-radical polymerization of suitable olefinic monomers, such as styrene, acrylonitrile, (meth)acrylates, (meth)acrylic acid and/or acrylamide, in a polyesterol or polyetherol serving as graft base. The side chains are generally produced via transfer of the free radicals from growing polymer chains onto polyesterols or polyetherols. The polymer polyol comprises, alongside the graft copolymers, mainly the homopolymers of the olefins, dispersed in unaltered polyesterol or respectively, polyetherol. In one preferred embodiment, the monomers used comprise acrylonitrile or styrene, preferably acrylonitrile and styrene. The monomers are optionally polymerized in the presence of further monomers, of a macromer, i.e. of an unsaturated polyol capable of free-radical polymerization and of a moderator and with use of a free-radical initiator, mostly azo compounds or peroxide compounds, in a polyesterol or polyetherol as continuous phase. This process is described by way of example in U.S. Pat. Nos. 3,304,273, 3,383,351, 3,523,093, DE 1152536 and DE 1152537.

During the free-radical polymerization reaction, the macromers are concomitantly incorporated into the copolymer chain. This gives block copolymers having a polyester block or, respectively, polyether block and a polyacrylonitrile-styrene block; these act as compatibilizers at the interface between continuous phase and disperse phase, and suppress agglomeration of the polymer polyesterol particles. The proportion of the macromers is usually from 1 to 20% by weight, based on the total weight of the monomers used to produce the polymer polyol.

If the material comprises polymer polyol, this is preferably present together with further polyols, for example polyetherols, polyesterols or a mixture of polyetherols and polyesterols. The proportion of polymer polyol is particularly preferably greater than 5% by weight, based on the total weight of mixture. The amount of the polymer polyols comprised can by way of example, based on the total weight of the mixture, be from 7 to 90% by weight, or from 11 to 80% by weight. The polymer polyol is particularly preferably polymer polyesterol or polymer polyetherol.

The prepolymers might also contain polyols with a molecular weight preferably smaller than 450 g/mol, particularly preferably from 60 to 400 g/mol, which have at least 2 hydrogen atoms reactive toward isocyanates. It is preferable to use diols and/or triols having molecular weights smaller than 400, particularly preferably from 60 to 300, and in particular from 60 to 150. Examples of those that can be used are aliphatic, cycloaliphatic, and/or araliphatic diols having from 2 to 14, preferably from 2 to 10, carbon atoms, e.g. ethylene glycol, 1,3-propanediol, 1,10-decanediol, 1,2-, 1,3-, or 1,4-dihydroxycyclohexane, diethylene glycol, dipropylene glycol and 1,4-butanediol, 1,6-hexanediol, tripropyleneglycol and bis(2-hydroxyethyl)hydroquinone, triols, such as 1,2,4- or 1,3,5-trihydroxycyclohexane, glycerol and trimethylolpropane, and low-molecular-weight hydroxylated polyalkylene oxides based on ethylene oxide and/or on propylene 1,2-oxide and on the abovementioned diols and/or triols, as starter molecules. Preferred is 1,2- propanediol, dipropylene glycol, tripopylenegycol, monoethylene glycol, 1,4-butanediol, diethylene glycol, glycerol or a mixture thereof. The concentration of the low molecular weight substances in the prepolymer composition is below 15 wt. %, preferably below 8 wt. %.

The low molecular weight polyols may be the only polyol, but preferably are used together with the previously mentioned higher molecular weight polyols. The low molecular weight polyols may be used together for example with the polyetherols or polyesterols. The low molecular weight polyols are generally employed below 15% by weight, below 8% by weight, preferably from about 2% to about 8% by weight, based on the combined weight of the low molecular weight polyols and high molecular weight polyols.

Polyetherols and polyesterols are preferred. A blend of a polyetherol and a polyesterol is also very effective.

The polyol compounds may be strictly "di" hydroxy compounds or with the hydroxyl functionality being in general from about 1.7 to about 3.0 or to about 4.0.

The isocyanate prepolymers are obtainable by reacting the polyisocyanate compounds with the polyol compounds, for example at temperatures of from 30 to 100° C., preferably at about 80° C. The method of producing an isocyanate prepolymer is preferably such that the isocyanate content in the prepolymer is from about 6 to about 28% by weight, particularly preferably from about 10 to about 25% by weight, and more particularly from about 13 to about 23% by weight, based on the weight of the prepolymer. They readily dissolve in ethyl acetate.

The present adhesive layer comprises the isocyanate prepolymers. No additional long chain polyols or chain extenders are required as in a 2K polyurethane adhesive.

The present adhesive layer may consist essentially of the present isocyanate prepolymers. The present adhesive layer may consist of the present isocyanate prepolymers.

The present adhesive layer may also comprise a customary polyurethane catalyst. Therefore, the present adhesive layer may consist essentially of the present isocyanate prepolymers and a customary polyurethane catalyst or may consist of the present isocyanate prepolymers and a customary polyurethane catalyst.

Preferably, the isocyanate prepolymers comprise only the polyisocyanate compounds and the polyetherol, polyesterol, polycarbanatediol, polylactonediol and/or low molecular weight polyol (<450 g/mol) compounds described above. Of course, some products of polyisocyanates may be present, such as biurets, allophanates and isocyanurates. No other compounds besides the polyisocyanates or mixtures thereof and the polyetherols, polyesterols, polycarbanatediols, polylactonediols or mixtures thereof preferably are present.

The prepolymers may be applied neat to a print layer or a film of the multilayer composition. The prepolymers may also be diluted with a solvent such as ethyl acetate prior to application. As the solvent evaporates, the adhesive layer may consist essentially or consist of the present isocyanate prepolymers.

The prepolymers may be stored neat without solvent.

Hyperbranched Polyester Binder

The present hyperbranched polyesters are for example those disclosed in U.S. Pat. Nos. 6,569,956, 6,974,631 and 5,376,460 and U.S. Pub. Nos. 2005/0147834, 2007/0213501, 2014/065385 and 2014/0193619, the disclosures of which are incorporated by reference.

The hyperbranched polyesters are for instance prepared by a condensation reaction of polyol monomers and polycarboxylic monomers.

Suitable polyols include aliphatic, cycloaliphatic and aromatic polyols. Examples are 1,6-hexanediol, pentaerythritol, trimethylolpropane, bis(trimethylolpropane), glycerol, 2-methyl-1,3-propanediol, neopentyl glycol, 2-butyl-2-ethyl-1,3-propanediol, ethylene glycol, propylene glycol, 1,4-butanediol, 1,3-butanediol, 1,5-pentanediol, trimethylolethane, 3-hydroxy-2,2-dimethylpropyl 3-hydroxy-2,2-dimethylpropionate, 1,2-, 1,3- and 1,4-cylohexanediol, 1,2-, 1,3- and 1,4-cyclohexandimethanol and hydrogenated bisphenol A. Examples also include alkoxylated, eg. ethoxylated or propoxylated derivatives of these polyols. Mixtures of polyols may be advantageously employed.

Suitable polycarboxylic monomers include the free carboxylic acids as well as lower alkyl esters and anhydrides thereof. Examples include 1,2-cyclohexanedicarboxylic acid, hexahydrophthalic anhydride, methylhexahydrophthalic anhydride, 1,3-cyclohexanedicarboxylic acid, 1,4-cyclohexanedicarboxylic acid, trimellitic anhydride, phthalic acid, phthalic anhydride, isophthalic acid, terephthalic acid, adipic acid, succinic acid, oxalic acid, malonic acid, giutaric acid, pimelinic add, suberic acid, azelaic acid, sebacic acid, undecane-α,ω-dicarboxylic acid, dodecane-α,ω-dicarboxylic acid, cyclopentane-1,2-dicarboxylic acid, cyclopentane-1,3-dicarboxylic acid and mixtures thereof. Esters are in particular methyl esters.

The polycarboxylic monomers are employed as free carboxylic acids or as derivatives thereof. Derivatives include anhydrides in monomeric or polymeric form, monoalkyl or dialkyl esters, in particular methyl or ethyl esters, monovinyl or divinyl esters and mixed esters. Esters also include isopropyl, n-propyl, n-butyl, isobutyl, sec-butyl and tert-butyl esters.

In particular, the polyols are selected from the group consisting of trimethylolpropane, glycerol and pentaerythritol, especially trimethyolpropane.

In particular, the polycarboxylic monomers are 1,2-cyclohexanedicarboxylic acid, hexahydrophthalic anhydride, 1,3-cyclohexanedicarboxylic acid, 1,4-cyclohexanedicarboxylic acid or methylhexahydrophthalic anhydride, preferably 1,2-cyclohexanedicarboxylic acid, hexahydrophthalic anhydride or 1,4-cyclohexandicarboxylic acid, especially hexahydrophthalic anhydride.

Thus, the present hyperbranched polyester is in particular a polymer comprising trimethyolpropane, glycerol, pentaerythritol or mixtures thereof and 1,2-cyclohexanedicarboxylic acid, hexahydrophthalic anhydride, 1,3-cyclohexanedicarboxylic acid, 1,4-cyclohexanedicarboxylic acid, methylhexahydrophthalic anhydride or mixtures thereof. Preferably the hyperbranched polyester is a polymer comprising trimethylolpropane and 1,2-cyclohexanedicarboxylic acid, hexahydrophthalic anhydride or 1,4-cyclohexandicarboxylic acid, most preferably a polymer comprising trimethyolpropane and hexahydrophthalic anhydride.

The preparation of the hyperbranched polyesters may further employ aliphatic or cycloaliphatic diols as monomer components. The aliphatic diols are for instance the dihydric alcohols described above, for instance ethylene glycol, propane-1,2-diol, propane-1,3-diol, butane-1,3-diol, butene-1, 4-diol, butyne-1,4-diol, pentane-1,5-diol, neopentyl glycol, bis(hydroxymethyl)cyclohexanes such as 1,4-bis(hydroxymethyl)cyclohexane, 2-methyl propane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. The cycloaliphatic diols are for example 1,2- and 1,3-cyclopentanediol, 1,2-, 1,3- and 1,4-cyclohexanedol, 1,1-, 1,2-, 1,3- and 1,4-bis(hydroxymethyl)

cyclohexane, 1,1-, 1,2-, 1,3- and 1,4-bis(hydroxyethyl)cyclohexane and 2,2-bis(4'-hydroxycyclohexane) propane, preferably 1,2-, 1,3- and 1,4-cyclohexanediol, 1,2-, 1,3- and 1,4-bis(hydroxymethyl)cyclohexane and 2,2-bis(4'-hydroxycyclohexane) propane.

The ratio of the hydroxyl groups of the aliphatic or cycloaliphatic diols to the total amount of hydroxyl groups from the aliphatic or cycloaliphatic diols plus the polyol is from 0 to about 0.8, for instance from about 0.1 to about 0.8, preferably from about 0.2 to about 0.7, more preferably from about 0.2 to about 0.6.

The hyperbranched polyesters have pendant free hydroxyl groups and/or carboxyl groups. The carboxyl groups are in particular carboxylic acid groups and may also be carboxylic acid ester groups.

The molar ratio of hydroxyl groups in the polyol to the carboxyl groups in the polycarboxylic monomer is for instance from about 2:1 to about 1:2, preferably from about 1.5:1 to 1:2, in particular from about 1.5:1 to 1:1.5.

The condensation reaction is carried out according to known methods and may employ a suitable solvent, esterification or transesterification catalyst or a suitable further additive. Solvents include n-heptane, cyclohexane, toluene, xylene, ethylbenzene, chlorobenzene, dichlorobenzene, dioxane, tetrahydrofuran, methyl ethyl ketone and methyl isobutyl ketone. The reaction may be carried out in the absence of any solvent.

The amount of solvent employed in the condensation reaction is for instance at least 0.1% by weight, based on the mass of the starting materials, preferably at least 1% by weight and more preferably at least 10% by weight. It is also possible to use excesses of solvent, based on the mass of starting materials employed that are to be reacted, such as from 1.01 to 10 times by weight based on the weight of the starting materials. Solvent amounts of more than 100 times by weight are generally not advantageous.

In one preferred embodiment the reaction is carried out without addition of solvent.

To carry out the condensation reaction it is possible to operate in the presence of a water-removing agent, as an additive added at the beginning of the reaction. Suitable examples include molecular sieves, especially molecular sieve 4 Å, $MgSO_4$ and $Na_2SO_4$. It is also possible during the reaction to add further water remover or to replace water remover by fresh water remover. It is also possible to remove water and/or alcohol formed during the reaction by distillation and, for example, to use a water separator, in which case the water is removed with the aid of an azeotrope former.

Separation of water may also take place by stripping: for example, by passing a gas which is inert under the reaction conditions through the reaction mixture, additionally, if appropriate, to a distillation. Suitable inert gases include preferably nitrogen, noble gases, carbon dioxide, combustion gases, or oxygen depleted air (lean air) with an oxygen content e.g. from 4 to 10 vol %.

The condensation reacation can be carried out in the absence of catalysts.

In one embodiment the condensation reaction is conducted in the presence of at least one catalyst. These are preferably acidic inorganic, organometallic or organic catalysts or mixtures of two or more acidic inorganic, organometallic or organic catalysts.

Acidic inorganic catalysts for the purposes of the present invention are for example sulfuric acid, sulfates and hydrogen sulfates, such as sodium hydrogen sulfate, phosphoric acid, phosphonic acid ($H_3PO_3$), hyperphosphoric acid ($H_3PO_2$), aluminum sulfate hydrate, alum, acidic silica gel (pH ≤6, especially ≤5) and acidic aluminum oxide. Further acidic inorganic catalysts which can be used include, for example, aluminum compounds of the general formula $Al(OR^1)_3$ and titanates of the general formula $Ti(OR^1)_4$, it being possible for the radicals $R^1$ to be identical or different in each case and to be selected independently of one another from $C_1$-$C_{20}$ alkyl or $C_3$-$C_{12}$ cycloalkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, cyclopropyl, cyclobutyl, cyclopentyl, cyclohexyl, cycloheptyl, cyclooctyl, cyclononyl, cyclodecyl, cycloundecyl or cyclododecyl.

Each $R^1$ in $Al(OR^1)_3$ and/or $Ti(OR^1)_4$ are preferably identical and selected from n-butyl, isopropyl and 2-ethylhexyl.

Preferred acidic organometallic catalysts are chosen for example from dialkyltin oxides $R^1{}_2SnO$ or dialkyltin esters $R^1{}_2Sn(OR^2)_2$, in which $R^1$ is as defined above and can be identical or different.

$R^2$ can have the same definitions as $R^1$ and additionally can be $C_6$-$C_{12}$ aryl; for example phenyl, o-, m- or p-tolyl, xylyl or naphthyl. $R^2$ can in each case be identical or different.

Examples of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, dibutyltin dimaleate or dioctyltin diacetate.

Particularly preferred representatives of acidic organometallic catalysts are dibutyltin oxide, diphenyltin oxide and dibutyltin dilaurate. Further possible organometallic catalysts are organometallic bismuth or zirconium compounds.

Preferred acidic organic catalysts are acidic organic compounds containing, for example, phosphate groups, sulfonic acid groups, sulfate groups or phosphonic acid groups. Particular preference is given to sulfonic acids such as para-toluene sulfonic acid, benzene sulfonic acid, dodecylbenzene sulfonic acid, methanesulfonic acid and trifluoromethane sulfonic acid. Acidic ion exchangers can also be used as acidic organic catalysts, examples being polystyrene resins which contain sulfonic acid groups and have been crosslinked with about 2 mol % of divinylbenzene.

Combinations of two or more of the aforementioned catalysts can also be employed. A further possibility is to use organic or organometallic or else inorganic catalysts that are in the form of discrete molecules in an immobilized form, on silica gel or on zeolites, for example.

When employed, the amount of catalyst is from about 0.1% to about 10% by weight, preferably from about 0.2% to about 2% by weight, based on the weight of the starting materials.

In one embodiment the esterification catalyst is an enzyme. Preference is given to the use of lipases and esterases. A particularly suitable example is *Candida antarctica* lipase B. The enzyme is available commercially, for example, from Novozymes Biotech Inc., Denmark.

The enzyme is preferably employed in immobilized form, on silica gel or LEWATIT, for example. Methods of immobilizing enzymes are known per se, for example, from Kurt Faber, "Biotransformations in organic chemistry", 3rd edition 1997, Springer Verlag, section 3.2 "Immobilization" pages 345-356. Immobilized enzymes are available commercially, for example, from Novozymes Biotech Inc., Denmark. The amount of enzyme used is usually from 1 to 20% by weight, in particular 10-15% by weight, based on the mass of the starting materials employed overall.

For carrying out the process of the invention it is one preferred embodiment to forego the use of enzymes.

In another preferred embodiment a non-metal containing catalyst is used for carrying out the condensation reaction.

In an especially preferred embodiment no catalyst is used for carrying out the condensation reaction. The latter is especially preferred in those cases in which the multilayer materials according to the invention are used as food packaging. The latter is furthermore especially preferred in those cases in which the polycarboxylic monomer is an acid anhydride.

The process for the preparation of the hyperbranched polyesters is carried out preferably under an inert gas atmosphere, such as under carbon dioxide, combustion gases, oxygen depleted air (lean air) with an oxygen content e.g. from 4 to 10 vol %, nitrogen or noble gas, for example, among which argon may be mentioned in particular.

The condensation reaction is carried out at temperatures from 60 to 250° C. It is preferred to operate at temperatures from 80 to 200° C., more preferably at 100 to 180° C. When using enzymes, 100° C. ought not to be exceeded.

The pressure conditions of the condensation reactions are not generally critical. It is possible to operate at a significantly reduced pressure, such as at from 10 to 500 mbar, for example. The condensation reactions can also be carried out at pressures above 500 mbar. Preference is given, on grounds of simplicity, to reaction at atmospheric pressure; also possible, however, is its implementation at a slightly elevated pressure, up to 1200 mbar for example. It is also possible to operate under significantly increased pressure, at pressures of up to 10 bar, for example. Reaction under reduced or atmospheric pressure is preferred, particular preference being given to atmospheric pressure.

The reaction time of the condensation reaction is normally from 10 minutes to 48 hours, preferably from 30 minutes to 24 hours and more preferably from 1 to 12 hours.

After the end of the condensation reaction the high-functionality hyperbranched polyesters can be isolated easily, by for example filtering off the catalyst and stripping off the solvent if appropriate, in which case the stripping of the solvent is normally carried out under reduced pressure. Further highly suitable workup methods are precipitation of the polymer following addition of water and subsequent washing and drying.

The hyperbranched polyesters will contain one or more functional groups —OH, —COOH or —COOR. The group R is methyl, ethyl, vinyl, isopropyl, n-propyl, n-butyl, isobutyl, sec-butyl or tert-butyl. In general, the hyperbranched polyesters will contain both —OH and —COOH groups.

The present hyperbranched polyesters are molecularly and structurally non-uniform and are highly branched.

The hyperbranched polyesters can be characterized conventionally by their hydroxyl number and their acid number. Preference is given to using hyperbranched polyesters which have an acid number of from about 10 to about 200 mg KOH/g, preferably about 20 to about 180, very preferably about 50 to about 150 and especially preferably about 70 to about 130 mg KOH/g and also an hydroxyl number of from about 50 to about 500 mg KOH/g, preferably about 100 to about 400, very preferably about 120 to about 300 and especially preferably about 150 to about 250 mg KOH/g although the invention is not restricted to such.

The acid number is determined according to previous DIN 53402. The hydroxyl number is determined according to DIN 53240, part 2.

The hyperbranched polyesters may have number-average molecular weight Mn of at least 300, preferably at least 400, more preferably at least 500, and especially preferably at least 600 g/mol. The molecular weight Mn may very preferably be at least 2000 g/mol. The upper limit of the molecular weight Mn is preferably 25,000 g/mol, more preferably it is not more than 15,000 g/mol, with very particular preference it is not more than 10,000 g/mol, and especially preferably not more than 5,000 g/mol.

The uniformity of the hyperbranched polyesters may be indicated conventionally through the ratio Mw/Mn. Mw/Mn is generally from 1.1 to 20, preferably from 1.2 to 15, with very particular preference from 1.2 to 10, and especially from 1.3 to 5.

The figures given for polydispersity and also for the number-average and weight-average molecular weight Mn and Mw refer here to measurements made by gel permeation chromatography using polymethyl methacrylate as the standard and tetrahydrofuran, dimethylacetamide or hexafluoroisopropanol as the eluent. The method is described in Analytiker Taschenbuch Vol. 4, pages 433 to 442, Berlin 1984.

Preferred polyesters in accordance with the invention have a glass transition temperature of from about 0 to about 100° C., preferably about 25 to about 55° C. and very preferably about 30 to about 50° C.

The glass transition temperature $T_g$ is determined by the DSC method (differential scanning calorimetry) in accordance with ASTM 3418/82.

First Polymer Film and Second Film

The first film of the multilayer composition is a polymer film. Polymer films suitable for packaging materials are well known. They include for instance polyolefin films such as polyethylene (PE), polypropylene (PP), poly(4-methyl-1-pentene) or polystyrene (PS). Polyethylene films may be high density (HDPE), low density (LDPE) or linear low density (LLDPE). The polymer films may further be ethylene-vinyl acetate (EVA), ethylene-vinyl alcohol (EVOH), ethylene-acrylic acid (EAA), ethylene-methacrylic acid (EMM) or styrene/butadiene copolymers. Polypropylene films may be oriented (OPP) or biaxial oriented (BOPP) films. Polymer films may also be polyvinylchloride (PVC), polyvinylidenechloride (PVDC), polylactic acid (PLA) or polycarbonate films.

The first film may also be selected from polar materials, such as cellophane, a polyester such as polyethylene terephthalate (PET), polybutylene terephthalate (PBT) or polyethylene naphthalate (PEN) or a polyamide (PA) such as PA 66, PA 6, PA 12, PA 6/66, PA 6/12 or PA11.

The first film is preferably a film of polyethylene, polypropylene, polystyrene, polyester or polyamide, with very particular preference being given to PET, PEN, and polyamide films.

The first film may be a monolayer film. Alternatively, it may be a multilayer film. Multilayer films are preferably produced by co-extrusion. The layers may be composed of chemically identical, similar or different polymers. For example, a polyvinyl alcohol layer may be embedded between two polyolefin films, or LLDPE combined with LDPE. The term "multilayer films" also embraces laminates of polymer films and metal foils, especially aluminum foils.

The first film may also be coated. Examples that may be mentioned here include metallized films, especially films vapor coated with Al, or films (vapor) coated with silicon oxide ($SiO_2$) or aluminum oxide ($Al_2O_3$).

For the second film it is possible to use polymer films, including metallized polymer films, or metal foils. Suitable polymer films include in particular the materials disclosed for the first film. Metal foils used in particular are aluminum foils, although it is also possible, for example, for these foils to be tin foils, copper foils or gold foils.

Particularly preferred multilayer compositions comprise at least one polar film in combination with a nonpolar film. Examples that may be mentioned include laminates of polyamide films or polyester films with polyolefin films, especially polyethylene or polypropylene films. Further preference is given to multilayer compositions of polyamide and polyester films or to laminates containing in each case only polyamide or only polyester films.

Preferably the first film is selected from the group consisting of PE, PP, PET and polyamides, more preferably selected from the group consisting of PE, PP and PET and even more preferably selected from the group consisting of PE, OPP and PET.

Preferably the second film is selected from the group consisting of metallized PE, non-metallized PE, OPP and PET, more preferably selected from the group consisting of metallized or non-metallized PE, OPP and PET, and even more preferably selected from the group consisting of PE, OPP and PET.

In one embodiment of the invention the first and second films are both are OPP.

In another embodiment of the invention the first film is PET or OPP and the second film is PE.

Print Layer

The multilayer material of the invention further comprises at least one print (ink) layer which is obtainable by printing or coating at least one of the films with a packaging printing ink.

The print layer is between the first and second films, i.e. embedded in the multilayer construction (laminate). The print layer may lie directly on one of the films or there may be one or more other layers between the film and the print layer. The print layer is preferably printed directly either onto the first or second films.

The multilayer composition may also comprise two or more print layers. With preference, all of the print layers include a hyperbranched polyester binder. The minimum requirement, however, is that at least one of the print layers contains said hyperbranched polyester. The print layers may be printed over one another. For example a first color print layer may be printed onto a film, followed by a second layer with a white- or multicolor decoration. Alternatively, a primer can be printed onto one film and the decoration onto the other film, or else the primer onto one side and the decoration onto the other side of the same film.

Of course, a multilayer composition may also include further films in addition to the first polymer film and second film. The sequence of the films in the laminate is determined by the skilled worker in accordance with the desired properties and the intended use of the multilayer composition.

The multilayer composition may also comprise additional layers with which in each case particular properties can be achieved. Mention may be made in particular of adhesive layers, which can be used to join some or all of the layers to one another. Further, it is possible to incorporate additional barrier layers. By way of example, polyvinyl alcohol layers or ethylene-polyvinyl alcohol layers may be incorporated as water vapor barriers. It is also possible to install odor or aroma barriers. Suitable materials for this purpose are disclosed, for example, in EP707956 or EP802045.

The print layers in the multilayer composition are obtainable by printing or coating the films with an appropriate packaging printing ink. Printing is carried out preferably by means of flexographic or gravure methods, although screen printing or inkjet printing can be used in certain cases.

The term "packaging printing inks" or "printing inks for packaging" for the purposes of this invention are meant solvent-containing printing inks for flexographic and/or gravure printing which cure by evaporation of the solvent. The term "printing inks for packaging" is both self-explanatory and restrictive. Printing inks for packaging are fast-drying printing inks with low viscosity about 50-200 mPas, preferably, 80-150 mPas in accordance with ASTM D2196 (Brookfield) at 25° C. at a shear rate of 30 rpm, spindle number 62. Accordingly, they contain relatively low-boiling solvents. Their boiling point is generally from 50° C. to 140° C. at 1013 hPa.

Screen printing inks are formulated in much the same way as flexographic or gravure inks but are adjusted to a slightly higher viscosity and normally contain solvents with boiling points from 60° C. to 170° C. at 1013 hPa.

In accordance with the invention, the printing ink comprises a binder component that is based on a hyperbranched polyester containing functional groups selected from the group consisting of OH, COOH and COOR groups. The term "binder" as well is self-explanatory and at the same time restrictive. Binders are one of the principal constituents of printing inks and are responsible for the actual formation of a film. They provide for the anchoring of pigments and fillers in the ink film and for adhesion to the substrate, and are used in the amount necessary to achieve this effect.

The hyperbranched polyester may be employed together as a mixture with other binders.

Examples of further binders for the printing inks of the invention are polyvinylbutyral, nitrocellulose, polyamides, polyurethanes, polyvinyl chlorides, polyketones, polycarbonates, polyacrylates and polyacrylate copolymers. Preferred further binders are selected from the group consisting of nitrocellulose, polyurethanes, and polyvinylbutyral, especially preferred as further binders are nitrocellulose and/or polyurethanes. A combination which has proven particularly advantageous is that of the hyperbranched polyesters with nitrocellulose. The total amount of all the binders in the printing ink of the invention is normally about 5% to about 35% by weight, preferably about 6% to about 30% by weight and more preferably about 10% to about 25% by weight, based on total weight of the printing ink.

The weight ratio of hyperbranched polyester to the total amount of all the binders is at least 40% by weight, preferably at least 50% by weight, preferably at least 60% and especially preferably at least 70%.

The weight ratio of hyperbranched polyester to the total amount of all the binders is less than 100%, preferably not more than 90%, especially preferably not more than 80% by weight.

For instance, the weight ratio of hyperbranched polyester to the further binders is from 40/60 to 90/10 or from 70/30 to 80/20.

Nitrocellulose as binder can be used with a nitrogen content of less than 12.6% by weight (degree of nitration up to 85%). Preferred nitrocellulose is ester-soluble with a nitrogen content from 11.88 to 12.2 wt % and alcohol-soluble with a nitrogen content from 10.9 to 11.3 wt %, very preferred is the alcohol-soluble nitrocellulose.

Polyurethanes as binders are e.g described in U.S. Pub. 2012/263925 or U.S. Pat. No. 5,556,925, the disclosures of which are incorporated by reference.

A single solvent or else a mixture of two or more solvents can be used. Solvents suitable in principle include the customary solvents for printing inks, especially packaging inks. Particularly suitable as solvents for the printing ink of the invention are alcohols such as ethanol, 1-propanol, 2-propanol, ethylene glycol, propylene glycol, diethylene glycol and substituted alcohols such as ethoxypropanol and esters such as ethyl acetate, isopropyl acetate, and n-propyl, n-butyl, or t-butyl acetate. Water is also a suitable solvent in principle. Particularly preferred solvents are ethanol or mixtures composed predominantly of ethanol or ethyl acetate. The skilled worker will make an appropriate selection in accordance with the solubility properties of the hyperbranched polyester and with the desired drying speed required by the printing ink. Slow drying solvents can also be formulated with the invention. Typical slow drying solvents are glycol ethers, such as DOWANOL PM (mono propyleneglycol mono methyl ether) or DPM (dipropylene glycol methyl ether) or ethoxy propanol. It is normal to use from 40% to 80% by weight of solvent relative to the sum of all the constituents of the printing ink. Typical lamination packaging white ink formulated with traditional linear polyurethane contains 40% to 70% by weight solvent. A comparable hyperbranched polyester based white ink according to the present invention has 5 to 20%, preferably 10 to 12% by weight less solvent at equal print viscosity. With this measurement, the amount of VOC in the hyperbranched polyester based inks is lower than the traditional linear polyurethane based inks.

Colorants which can be used include the customary dyes and, in particular, customary pigments. Examples are inorganic pigments such as titanium dioxide pigments or iron oxide pigments, interference pigments, carbon blacks, metal powders such as aluminum, brass or copper powder, and also organic pigments such as azo, phthalocyanine or isoindoline pigments. Examples of preferred organic pigments are phthalocyanine blue 15:4, phthalocyanine green 7, green 36, yellow 12, yellow 14, red 57:1 and red 52:1. It is of course also possible to use mixtures of different dyes or colorants and also soluble organic dyes. It is usual to use from 5% to 25% by weight of colorant, relative to the sum of all the constituents of the printing ink.

The packaging ink of the invention may optionally comprise further additives and auxiliaries. Examples of additives and auxiliaries are fillers such as calcium carbonate, aluminum oxide hydrate or aluminum and/or magnesium silicate. Waxes raise the abrasion resistance and serve to enhance the lubricity. Examples are polyethylene waxes, oxidized polyethylene waxes, petroleum waxes or ceresin waxes. Fatty acid amides can be used for increasing the surface smoothness. Plasticizers serve to enhance the elasticity of the dried film. Examples are phthalates such as dibutyl phthalate, diisobutyl phthalate and dioctyl phthalate, citric esters or esters of adipic acid. For dispersing the pigments it is possible to use dispersing assistants. For improved adhesion of the ink to its substrate film adhesion promoters can be used. Examples are titanium chelates. In the case of the printing ink of the invention it is possible, advantageously, to work without adhesion promoters. The total amount of all of the additives and auxiliaries normally does not exceed 20% by weight relative to the sum of all the constituents of the printing ink, and is preferably 0% to 10% by weight.

The packaging ink of the invention can be prepared in a way which is known in principle, by intensively mixing and/or dispersing the constituents in customary apparatus such as dissolvers, stirred ball mills or a triple-roll mill. Advantageously, a concentrated pigment dispersion is first prepared with a portion of the components and a portion of the solvent, and is subsequently processed further to the finished printing ink with additional constituents and further solvent.

Surprisingly, through the use of printing inks with binders based on hyperbranched polyesters and present 1K isocyanate prepolymer adhesive layer, multilayer materials with outstanding adhesion between the individual layers are obtained.

The print layer which is obtained with the packaging printing ink has essentially the same composition of the printing ink, except that some or all of the solvents and any volatiles have evaporated.

The multilayer materials according to the invention comprise at least a first polymer film and a second film, at least one layer which is printed with the printing ink according to the invention and further at least one 1K isocyanate prepolymer adhesive layer between the print layer and one of the films.

Without being bound by theory, it is believed that the free —OH, —COOH and/or —COOR groups of the hyperbranched polyester binder react with the 1K isocyanate prepolymer adhesive to form strong adhesion between a printed film and the other film.

For instance, a first film is printed with a printing ink. A present 1K isocyanate prepolymer adhesive is applied to either the printed surface or a second film. The first and second films are then pressed together to form a present multilayer construction (laminate). The adhesive layer is between the two films. For instance, a first PET or OPP film is printed with a printing ink. The 1K isocyanate prepolymer is coated onto the printed surface. A sealant PE film is then applied on the adhesive layer to form a present multilayer composition.

The adhesive layer may comprise a customary polyurethane catalyst. Alternatively, the printing ink may comprise a customary polyurethane catalyst, or both the printing ink and the adhesive may comprise a customary polyurethane catalyst.

Generally, there is no catalyst in the adhesive layer while there may be one in the print layer.

Customary polyurethane catalysts include amidines, such as 2,3-dimethyl-3,4,5,6-tetrahydropyrimidine, tertiary amines, such as triethylamine, tributylamine, dimethylbenzylamine, N-methyl-, N-ethyl- or N-cyclohexylmorpholine, N,N,N',N'-tetramethyl-ethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds, such as triethanolamine, triisopropanolamine, N-methyl- and N-ethyldiethanolamine and dimethylethanolamine. Organometallic compounds can also be used, preferably organotin compounds, such as stannous salts of organic carboxylic acids, e.g. stannous acetate, stannous octoate, stannous ethylhexoate and stannous laurate, and the dialkyltin(IV) salts of organic carboxylic acids, e.g. dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate, or a mixture thereof. The organometallic compounds can be used alone or preferably in combination with strongly basic amines.

A further subject of the present invention is a method of preparing a multilayer composition for packaging, which method comprises printing a first polymer film or a second film with a printing ink, applying a 1K isocyanate prepolymer adhesive to the printed surface or to the other film and pressing the two films together with the adhesive and print layer between the two films, where the print layer contains a hyperbranched polyester binder containing functional groups selected from the group consisting of —OH, —COOH and —COOR, where R is methyl, ethyl, vinyl, isopropyl, n-propyl, n-butyl, isobutyl, sec-butyl or tert-butyl.

In the present method, no additional long chain polyols or chain extenders are combined with the 1K isocyanate prepolymer as would be required with a 2K polyurethane adhesive system. A 2K system of isocyanate prepolymer/long chain polyol is also referred to as an adhesive/curing agent system. Thus, in the present invention, no curing agents are required.

The term "a" referring to elements of an embodiment may mean "one" or "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

U.S. patents, U.S. published patent applications and U.S. patent applications discussed herein are each hereby incorporated by reference.

Following are some embodiments of the invention.

Embodiment 1. A multilayer composition for packaging comprising a first polymer film, a second film, at least one print layer between the films and a 1K isocyanate prepolymer adhesive layer between the at least one print layer and one of the films,
where the print layer contains a hyperbranched polyester binder containing functional groups selected from the group consisting of —OH, —COOH and —COOR, where R is methyl, ethyl, vinyl, isopropyl, n-propyl, n-butyl, isobutyl, sec-butyl or tert-butyl.

Embodiment 2. The multilayer composition according to embodiment 1 where the isocyanate prepolymer consists essentially of one or more organic polyisocyanate compounds and one or more polyol compounds selected from the group consisting of polyetherols, polyesterols, polycarbonaediols and polylactonediols.

Embodiment 3. The multilayer composition according to embodiment 1 where the isocyanate prepolymer consists essentially of one or more organic polyisocyanate compounds selected from the group consisting of 4,4'-diisocynatodiphenylmethane, 2,4'-diisocyanatodiphenylmethane and polymeric diisocyanatodiphenylmethane (PMDI) and one or more polyol compounds selected from the group consisting of polyetherols and polyesterols.

Embodiment 4. The multilayer composition according to embodiments 2 or 3 where the molecular weight of the one or more polyol compounds is from about 1000 g/mol to about 12000 g/mol, preferably from about 2000 g/mol to about 6000 g/mol, more preferably from about 3000 g/mol to about 4000 g/mol.

Embodiment 5. The multilayer composition according to any of the preceding embodiments, where the hyperbranched polyester comprises
polyol monomers selected from the group consisting of trimethylolpropane, glycerol, pentaerythritol and mixtures thereof
and
polycarboxylic monomers selected from the group consisting of 1,2-cyclohexanedicarboxylic acid, hexahydrophthalic anhydride, 1,3-cyclohexanedicarboxylic acid, 1,4-cyclohexanedicarboxylic acid, methylhexahydrophthalic anhydride and mixtures thereof.

Embodiment 6. The multilayer composition according to embodiment 5, where the hyperbranched polyester comprises trimethylolpropane and 1,2-cyclohexanedicarboxylic acid, hexahydrophthalic anhydride or 1,4-cyclohexanedicarboxylic acid monomers, preferably trimethylolpropane and hexahydrophthalic anhydride monomers.

Embodiment 7. The multilayer composition according to embodiments 5 or 6, where the hyperbranched polyester further comprises aliphatic or cycloaliphatic diol monomers.

Embodiment 8. The multilayer composition according to any of the preceding embodiments, where the molecular weight Mn of the hyperbranched polyester is from about 300 g/mol to about 25,000 g/mol, preferably from about 400 g/mol to about 15,000 g/mol, more preferably from about 500 g/mol to about 10,000 g/mol and most preferably from about 600 g/mol to about 5,000 g/mol.

Embodiment 9. The multilayer composition according to any of the preceding embodiments, where the print layer contains one or more further binders selected from the group consisting of polyvinylbutyral, nitrocellulose, polyamides, polyurethanes, polyvinyl chlorides, polyketones, polycarbonates, polyacrylates and polyacrylate copolymers.

Embodiment 10. The multilayer composition according to embodiment 9, where the weight ratio of hyperbranched polyester binder to the total of all binders is at least 50%, preferably at least 60% and more preferably at least 70%.

Embodiment 11. The multilayer composition according to any of the preceding embodiments, where the first film is a polyethylene, polypropylene, polystyrene, polyester or polyamide film and where the second film is a polyethylene, polypropylene, polystyrene, polyamide or aluminum film.

Embodiment 12. The multilayer composition according to any of the preceding embodiments, where the adhesive layer consists essentially or consists of the isocyanate prepolymer.

Embodiment 13. The multilayer composition according to any of embodiments 1-11, where the isocyanate content of the prepolymer is from about 6% to about 28% by weight, preferably from about 10% to about 25% by weight and more preferably from about 13% to about 23% by weight, based on the weight of the prepolymer.

Embodiment 14. The multilayer composition according to any of embodiments 1-13, where the print layer contains a polyurethane catalyst.

Embodiment 15. A method of preparing a multilayer composition for packaging, which method comprises printing a first polymer film or a second film with a printing ink, applying a 1K isocyanate prepolymer adhesive to the printed surface or to the other film and pressing the two films together with the adhesive and print layer between the two films, where the print layer contains a hyperbranched polyester binder containing functional groups selected from the group consisting of —OH, —COOH and —COOR, where R is methyl, ethyl, vinyl, isopropyl, n-propyl, n-butyl, isobutyl, sec-butyl or tert-butyl.

EXAMPLES

Isocyanate Prepolymers

Prepolymer 1 is an isocyanate prepolymer based on 4,4'-MDI and polyesterols with an NCO content of 16%.

Prepolymer 2 is an isocyanate prepolymer based on 4,4'-MDI and polyesterols with an NCO content of 19%.

Prepolymer 3 is an isocyanate prepolymer based on 4,4'-MDI and polyetherol with an NCO content of 18%.

Prepolymer 4 is an isocyanate prepolymer prepared by the following general procedure: In a 4-head vessel equipped with stirrer, cooler and nitrogen inlet, 584.9 grams(g) of LUPRANAT MES, 40 g LUPRANAT MM 103 and 0.1 g diglycol-bis-chlorformate are added. The isocyanate is heated to 60° C. Once the temperature of the mixture reaches 60° C. a mixture of 20 g dipropylenglycol and 355 g polyproplyeneglycol (OH-value 55 mg KOH/g) are added to the mixture at a speed such that the exotherm of the reaction is getting not higher than 75° C. Once all material is added the mixture is stirred for an additional 2 hours at 80° C. The material is allowed to cool to room temperature. The prepolymer composition has an NCO content of 17.8%.

Prepolymer 5 is prepared by the general procedure with 453 g LUPRANAT MES, 40 g LUPRANAT MM 103, 0.1 g diglycol-bis-chlorformate, 20 g dipropylenglycol and 487.9 g of a polyetherol prepared from alkoxylation of propylenglycol with propylene- and ethyleneoxide with an OH-value of 29 mg KOH/g. The prepolymer has an NCO content of 14.7%.

Prepolymer 6 is prepared by the general procedure with 487 g of LUPRANAT MES, 0.1 g diglycol-bis-chlorformate and 492.9 g of a polyetherol prepared from alkoxylation of propylenglycol with propylene- and ethyleneoxide with an OH-value of 29 mg KOH/g. The prepolymer composition has an NCO content of 13.4%.

Prepolymer 7 is prepared by the general procedure with 600 g of LUPRANAT MI, 0.1 g diglycol-bis-chlorformate, a mixture of 50 g dipropylenglycol and 200 g of a polyetherol prepared from alkoxylation of propylenglycol with propylene- and ethyleneoxide with an OH-value of 29 mg KOH/g and 200 g of polyproplyeneglycol with an OH-value 55 mg KOH/g. The prepolymer composition has an NCO content of 15%.

Prepolymer 8 is prepared by the general procedure with 500 g LUPRANAT MI, 0.1 g diglycol-bis-chlorformate and 500 g of polyproplyeneglycol with an OH-value 55 mg KOH/g. The prepolymer composition had NCO-value of 14.7%

Prepolymer 9 is prepared by the general procedure with 550 g LUPRANAT MI, 0.1 g diglycol-bis-chlorformate and 450 g of polyproplyeneglycol with an OH-value 104 mg KOH/g. The prepolymer composition has an NCO content of 14.8%.

Prepolymer 10 is prepared by the general procedure with 645 g LUPRANAT MI, 0.1 g diglycol-bis-chlorformate and 355 g of polyproplyeneglycol with an OH-value 248 mg KOH/g. The prepolymer has an NCO content of 14.9%.

Prepolymer 11 is ELASTAN 6578/105, an isocyanate prepolymer from BASF based on 4,4'-MDI and 2,4'-MDI and polyetherols with an NCO content of 17.9%.

Prepolymer 12 is ELASTAN 6578/117, an isocyanate prepolymer from BASF based on 4,4'-MDI and carbodiimide modified 4,4'-MDI and polyetherols with an NCO content of 16%.

Prepolymer 13 is ELASTAN 6578/116, an isocyanate prepolymer from BASF based on 4,4'-MDI, 2,4-MDI and PMDI and polyetherols with an NCO content of 15.1%.

Prepolymer 14 is ELASTAN 6578/102, an isocyanate prepolymer from BASF based on 4,4'-MDI, 2,4-MDI and PMDI and polyetherols with an NCO content of 15.7%.

Prepolymer 15 is ELASTAN 6578/108, an isocyanate prepolymer from BASF based on PMDI and polyetherols with an NCO content of 15%.

Prepolymer 16 is PMDI with an NCO content of 31.5%.

The NCO contents are weight percent based on the weight of the prepolymer. LUPRANAT MES is 4,4'-MDI. LUPRANAT MM is carbodiimide modified 4,4'-MDI. LUPRANAT MI is a mixture of 4,4'-MDI and 2,4'-MDI.

Hyperbranched Polyesters

A hyperbranched polyester is prepared as follows. Molecular weights are determined by gel permeation chromatography, eluent: tetrahydrofuran, reference polymethyl methacrylate. Acid values determined according to previous DIN 53402. Hydroxyl values determined according to DIN 53240, part 2. Glass transition temperatures measured with differential scanning calorimetry. During the measurement, samples are cooled down to a starting temperature of ca. 50° C. below the Tg expected then heated up to a final temperature of ca. 50° C. above the Tg expected with a rate of 10° C./min. The given Tg represents the result of the second heating cycle.

Hyperbranched Polyester A

In a 2 liter round bottom flask equipped with mechanical stirrer, thermometer, gas inlet and distillation apparatus with collecting flask, 681 g (4.42 mol) of hexahydrophthalic anhydride CAS #85-42-7, 165 g (1.23 mol) trimethylolpropane, and 354 g (2.46 mol) 1,4-dimethylol-cyclohexane are placed. 0.36 g dibutyl tin dilaurate are added as catalyst and the reaction mixture is heated to 160° C. with stirring. The mixture is stirred at 160-180° C. for 2.5 h and reaction water is collected. The reaction is followed by acid number and stopped by cooling down to ambient temperature when an acid number of 137 mg KOH/g polymer is reached. The product is obtained as colorless resin. Acid number=137 mg KOH/g polymer, OH value=124 mg KOH/g polymer, Mn=360 g/mol, Mw=650 g/mol, Tg=23° C.

Hyperbranched Polyester B

In a 2 liter round bottom flask equipped with mechanical stirrer, thermometer, gas inlet and distillation apparatus with collecting flask, 580 g (3.76 mol) of hexahydrophthalic anhydride CAS #85-42-7, 420 g (3.13 mol) trimethylolpropane are placed. 0.3 g dibutyl tin dilaurate are added as catalyst and the reaction mixture is heated to 160° C. with stirring. The mixture is stirred at 180° C. for 6 h and reaction water is collected. The reaction is followed by acid number and stopped by cooling down to ambient temperature when an acid number of 92 mg KOH/g polymer is reached. The product is obtained as colorless resin. Acid number=92 mg KOH/g polymer, OH value=191 mg KOH/g polymer, Mn=500 g/mol, Mw=2200 g/mol, Tg=44° C.

Print Layers

A white ink is prepared containing $TiO_2$, the present hyperbranched polyester binder, nitrocellulose and solvent. The weight ratio of nitrocellulose to polyester is about 30/70.

A control white ink is prepared containing $TiO_2$, a traditional polyurethane binder, nitrocellulose and solvent.

Inks are prepared by mixing a color dispersion which contains pigments, dispersing resins, dispersing additives and solvents, with letdown vehicles which are composed of polymer binders, additives and solvents.

Dispersions are prepared by grinding pigments with the LAU Disperser DAS H 200-K paint shaker using glass beads with 2 mm diameter as grinding media. Below are dispersion formulations used for white inks (percents by weight, total 100%).

Titanium dioxide 56%
Dispersant 7%
n-propanol/n-propyl acetate 37%

The letdown vehicle is prepared using Hyperbranched Polyester B by dissolving at least 50% but no greater than 75% by weight of the hyperbranched polyester in a standard solvent, typically n-propanol. The base inks are obtained by mixing color dispersion with letdown vehicles at a standard ratio with appropriate amount of solvent. The base ink viscosity is measured using Brookfield (ASTM D2196) and is adjusted close to 100 mPas print viscosity at 25° C. for flexographic printing with solvent mix.

A control ink is prepared with a polyurethane ink vehicle.

Results

A polypropylene film is printed with the white inks. The printed surface is laminated with an isocyanate prepolymer. The isocyanate preopolymer is diluted with ethyl acetate before being applied to the printed surface with a K-2 wire wound rod (8 micron thickness). Lamination bond strength is measured after curing for 5-7 days. Bond strength is measured by an INSTRON tensile tester with a 12 inch/min peel rate at room temperature.

Bond strengths are as follows.

| adhesive | lamination strength (gf/in) |
|---|---|
| 2K polyurethane (control) | 542 |
| prepolymer 1 | 446 |
| prepolymer 2 | 525 |
| prepolymer 3 | film tear |
| prepolymer 4 | 259 |
| prepolymer 5 | film tear |
| prepolymer 6 | 473 |
| prepolymer 7 | 426 |
| prepolymer 8 | 511 |
| prepolymer 9 | 327 |
| prepolymer 10 | film tear |
| prepolymer 11 | 445 |
| prepolymer 12 | 408 |
| prepolymer 13 | 434 |
| prepolymer 14 | 472 |
| prepolymer 15 | 519 |
| prepolymer 16 | 33 |

Lamination strength is measured in gram force per linear inch (gf/in). The conversion to metric is 1 Newton per 15 mm=172.67 gram force per linear inch.

Prepolymers 3, 5 and 10 exhibit the highest lamination bond strength as the film is torn prior to data being collected.

Prepolymer 16 is a reference example.

When printed over the white ink containing a traditional polyurethane binder, a lamination bond strength of 290 gf/inch is obtained with prepolymer 2.

A minimal bond strength for medium lamination performance is at least 300 gf/in.

The invention claimed is:

1. A multilayer composition for packaging, the composition comprising:
   a first polymer film;
   a second film;
   at least one print layer between the films; and
   a 1K prepolymer adhesive layer between the at least one print layer and the first polymer film or the second film;
   wherein:
   the print layer comprises a hyperbranched polyester binder containing functional groups selected from the group consisting of —OH, —COOH, and —COOR, wherein R is methyl, ethyl, vinyl, isopropyl, n-propyl, n-butyl, isobutyl, sec-butyl, or tert-butyl; and
   the multilayer composition has a bond strength of at least 300 gf/in.

2. The multilayer composition of claim 1, wherein the prepolymer consists essentially of one or more organic polyisocyanate compounds and one or more polyol compounds selected from the group consisting of polyetherols, polyesterols, polycarbonaediols and polylactonediols.

3. The multilayer composition of claim 1, wherein the prepolymer consists essentially of one or more organic polyisocyanate compounds selected from the group consisting of 4,4'-diisocynatodiphenylmethane, 2,4'-diisocyanatodiphenyl methane and polymeric diisocyanatodiphenylmethane (PMDI) and one or more polyol compounds selected from the group consisting of polyetherols and polyesterols.

4. The multilayer composition of claim 2, wherein the molecular weight of the one or more polyol compounds is from about 1000 g/mol to about 12000 g/mol.

5. The multilayer composition of claim 1, wherein the hyperbranched polyester comprises:
   a polyol monomer selected from the group consisting of trimethylolpropane, glycerol, pentaerythritol, and mixtures thereof
   a polycarboxylic monomer selected from the group consisting of 1,2-cyclohexanedicarboxylic acid, hexahydrophthalic anhydride, 1,3-cyclohexanedicarboxylic acid, 1,4-cyclohexanedicarboxylic acid, methylhexahydrophthalic anhydride, and mixtures thereof.

6. The multilayer composition of claim 5, wherein the hyperbranched polyester comprises trimethylolpropane and 1,2-cyclohexanedicarboxylic acid, hexahydrophthalic anhydride or 1,4-cyclohexanedicarboxylic acid monomers.

7. The multilayer composition of claim 5, wherein the hyperbranched polyester further comprises aliphatic or cycloaliphatic diol monomers.

8. The multilayer composition of claim 1, wherein the molecular weight Mn of the hyperbranched polyester is from about 300 g/mol to about 25,000 g/mol.

9. The multilayer composition of claim 1, wherein the print layer comprises one or more further binders selected from the group consisting of polyvinylbutyral, nitrocellulose, polyamides, polyurethanes, polyvinyl chlorides, polyketones, polycarbonates, polyacrylates and polyacrylate copolylmers.

10. The multilayer composition of claim 9, wherein a weight ratio of hyperbranched polyester binder to the total of all binders is at least 50%.

11. The multilayer composition of claim 1, wherein the first polymer film is a polyethylene, polypropylene, polystyrene, polyester or polyamide film, and wherein the second film is a polyethylene, polypropylene, polystyrene, polyamide or aluminum film.

12. The multilayer composition of claim 1, wherein the adhesive layer consists essentially of the prepolymer.

13. The multilayer composition of claim 1, wherein an isocyanate content of the prepolymer is from about 6% to about 28% by weight, based on the weight of the prepolymer.

14. A method of preparing a multilayer composition for packaging, the method comprising:
  printing a first polymer film or a second film with a printing ink comprising a solvent;
  applying a 1K prepolymer adhesive to the printed surface or to the other film;
  pressing the two films together with the adhesive and print layer between the two films; and
  curing the at least one print layer and the 1K prepolymer adhesive layer;
  wherein:
    the printing ink comprises a hyperbranched polyester binder containing functional groups selected from the group consisting of —OH, —COOH, and —COOR, where R is methyl, ethyl, vinyl, isopropyl, n-propyl, n-butyl, isobutyl, sec-butyl, or tert-butyl; and
    the multilayer composition has a bond strength of at least 300 gf/in.

15. The multilayer composition of claim 2, wherein the molecular weight of the one or more polyol compounds is from about 3000 g/mol to about 4000g/mol.

16. The multilayer composition of claim 5, wherein the hyperbranched polyester comprises trimethylolpropane and hexahydrophthalic anhydride monomers.

17. The multilayer composition of claim 1, wherein the molecular weight Mn of the hyperbranched polyester is from about 600 g/mol to about 5,000 g/mol.

18. The multilayer composition of claim 9, wherein a weight ratio of hyperbranched polyester binder to the total of all binders is at least 70%.

19. The multilayer composition of claim 1, wherein the adhesive layer consists of the prepolymer.

20. The multilayer composition of claim 1, wherein an isocyanate content of the prepolymer is from about 13% to about 23% by weight, based on the weight of the prepolymer.

21. The multilayer composition of claim 1, wherein the at least one print layer further comprises a solvent and the at least one print layer and the 1K prepolymer adhesive layer are configured to cure by evaporation of the solvent such that some or all of the solvent is evaporated from the print layer.

22. The method of claim 14, wherein the curing occurs by evaporating some or all of the solvent from the print layer.

\* \* \* \* \*